United States Patent
Gasperini et al.

(12)
(10) Patent No.: US 6,766,406 B1
(45) Date of Patent: Jul. 20, 2004

(54) FIELD PROGRAMMABLE UNIVERSAL SERIAL BUS APPLICATION SPECIFIC INTEGRATED CIRCUIT AND METHOD OF OPERATION THEREOF

(75) Inventors: Peter Gasperini, San Carlos, CA (US); Rajiv K. Singh, Broomfield, CO (US)

(73) Assignee: LSI Logic Corporation, Milpitas, CA (US)

( * ) Notice: Subject to any disclaimer, the term of this patent is extended or adjusted under 35 U.S.C. 154(b) by 526 days.

(21) Appl. No.: 09/973,267

(22) Filed: Oct. 8, 2001

(51) Int. Cl.[7] .............................................. G06F 13/00
(52) U.S. Cl. ....................................................... 710/315
(58) Field of Search ............................ 710/62, 65, 72, 710/100, 305, 315; 716/16, 17

(56) References Cited

U.S. PATENT DOCUMENTS

| | | | | |
|---|---|---|---|---|
| 6,044,428 A | * | 3/2000 | Rayabhari | 710/305 |
| 6,092,179 A | * | 7/2000 | Greenberger et al. | 712/35 |
| 6,260,087 B1 | * | 7/2001 | Chang | 710/100 |
| 6,370,603 B1 | * | 4/2002 | Silverman et al. | 710/72 |

OTHER PUBLICATIONS

Neil Hastie et al. "The Implementation of Hardware Subroutines on Field Programmable Gate Arrays" IEEE, 1990, pp. 31.4.31.4.4.*

Paul Dillen, Adaptive Hardware Becomes a Reality using Electrically Reconfigurable Arrays (ERAs), GEC Plessey Semiconductors, 1990. pp. 2/1–2/10.*

* cited by examiner

*Primary Examiner*—Xuan M. Thai
(74) *Attorney, Agent, or Firm*—Hitt Gaines PC

(57) ABSTRACT

The present invention provides a field programmable universal serial bus application specific integrated circuit and a method of operation thereof. In one advantageous embodiment, the field programmable universal serial bus application specific integrated circuit includes a universal serial bus function core configured to transmit and receive data via a universal serial bus and a programmable logic core having an array of dynamically configurable arithmetic logic units. The programmable logic core is configured to interface with the universal serial bus function core and implement at least one application level function capable of performing protocol conversion to at least one processor bus protocol.

20 Claims, 4 Drawing Sheets

FIELD PROGRAMMABLE UNIVERSAL SERIAL BUS APPLICATION SPECIFIC INTEGRATED CIRCUIT AND METHOD OF OPERATION THEREOF

TECHNICAL FIELD OF THE INVENTION

The present invention is directed, in general, to integrated circuits and, more specifically, to a field programmable universal serial bus application specific integrated circuit and a method of operation thereof.

BACKGROUND OF THE INVENTION

Today many computer systems, such as personal computers, include Universal Serial Bus (USB) technology. USB is a Plug-and-Play and Hot-Plugable interface for connecting a computer system to external devices, such as printers, scanners, keyboards, mice, telephones, and digital cameras. Plug-and-Play refers to the ability of a computer system to automatically configure and install the software drivers needed to communicate with the device plugged into the USB interface. Accordingly, with plug and play, there is no need to configure switches, jumpers, or other elements. HotPlugable refers to the ability to add and remove devices to the USB while the computer system is running and have the operating system automatically recognize the change. USB is expected to replace serial and parallel ports and become the preferred means of connecting low and medium bandwidth peripherals.

Typically, a USB supports data transfer rates of up to 12 Mbps (12 million bits per second) and a single USB port can accommodate up to 127 devices, such as mice, modems and keyboards. USB devices typically consist of peripheral function logic, a USB logical device, and the USB interface. A variety of different USB interfaces exist which would prove useful for a number of applications. However, design flexibility problems limit the implementation of USB interfaces.

Two main devices employed within USB interfaces are Field Programmable Gate Array (FPGA) chips and Application-Specific Integrated Circuits (ASIC) chips, each having its own benefits and limitations. FPGAs provide a great degree of flexibility when employed within a USB interface. Analogous with their name, FPGAs are field programmable devices that employ programmable gates to allow various configurations and can be reprogrammed in the field. This provides the ability to determine and correct any errors which may not have been detectable prior to use. Additionally, the FPGAs may be reprogrammed to accommodate new devices connected thereto.

One of the most noticeable drawbacks of an FPGA, however, is unfavorable performance. While FPGAs may be reprogrammed if a performance issue or an error is detected, this is not always the best solution to the problem. For example, depending on certain factors, an integrated device that may not be reprogrammed may be desired over a device that may be reprogrammed. One such factor may be the latency tolerable in the circuit. Also, compared to other interfaces, FPGAs experience certain density and speed limitation issues. The speed limitation may be attributed to the re-programmable nature of the FPGA's gates.

As previously stated, ASIC chips are also commonly used and implemented as part of USB interfaces. Compared to FPGAs, ASIC chips are regarded in the industry as being very fast and providing a high performance guarantee. However, ASIC chips also experience certain limitations. One of the main limitations of ASIC chips, and probably the most notable deterrent to using them more frequently, is their inability to be reprogrammed. Because they cannot be reprogrammed, an extremely large amount of time and money must be provided upon inception of design and manufacture.

One of the most common concerns for digital designers for ASIC products is achieving optimum design flexibility without sacrificing performance. In order to support multiple interfaces or increased functionality, designers are typically forced to instantiate almost every conceivable functionality or interface at the expense of the product size and cost. Otherwise, the potential functionality or interface flexibility of the production product will be sacrificed.

Accordingly, what is needed in the art is a USB interface device that includes the benefits of prior art FPGAs and ASIC chips, however, a USB interface device that does not experience their drawbacks.

SUMMARY OF THE INVENTION

To address the above-discussed deficiencies of the prior art, the present invention provides a field programmable universal serial bus application specific integrated circuit and a method of operation thereof. In one embodiment, the field programmable universal serial bus application specific integrated circuit includes: (1) a universal serial bus function core configured to transmit and receive data via a universal serial bus and (2) a programmable logic core having an array of dynamically configurable arithmetic logic units. The programmable logic core is configured to interface with the universal serial bus function core and implement at least one application level function capable of performing protocol conversion to at least one processor bus protocol.

In another embodiment, the present invention provides a method of operating a field programmable universal serial bus application specific integrated circuit that includes: (1) configuring a programmable logic core, having an array of dynamically configurable arithmetic logic units, to interface with a universal serial bus function core and implement at least one application level function capable of performing protocol conversion to at least one processor bus protocol, (2) transmitting and receiving data via a universal serial bus with the universal serial bus function core.

The present invention also provides, in one advantageous embodiment, a universal serial bus protocol adapter system that includes a field programmable universal serial bus application specific integrated circuit having: (1) a universal serial bus function core that transmits and receives data via a universal serial bus, and (2) a programmable logic core having an array of dynamically configurable arithmetic logic units. The programmable logic core interfaces with the universal serial bus function core and implements at least one application level function capable of performing protocol conversion to at least one processor bus protocol. The universal serial bus protocol adapter system further includes a host processor that receives and transmits data with the field programmable universal serial bus application specific integrated circuit in the at least one processor bus protocol, and at least one universal serial bus transceiver, coupled to the field programmable universal serial bus application specific integrated circuit, that provides a physical interface to at least one peripheral device coupled to the universal serial bus.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
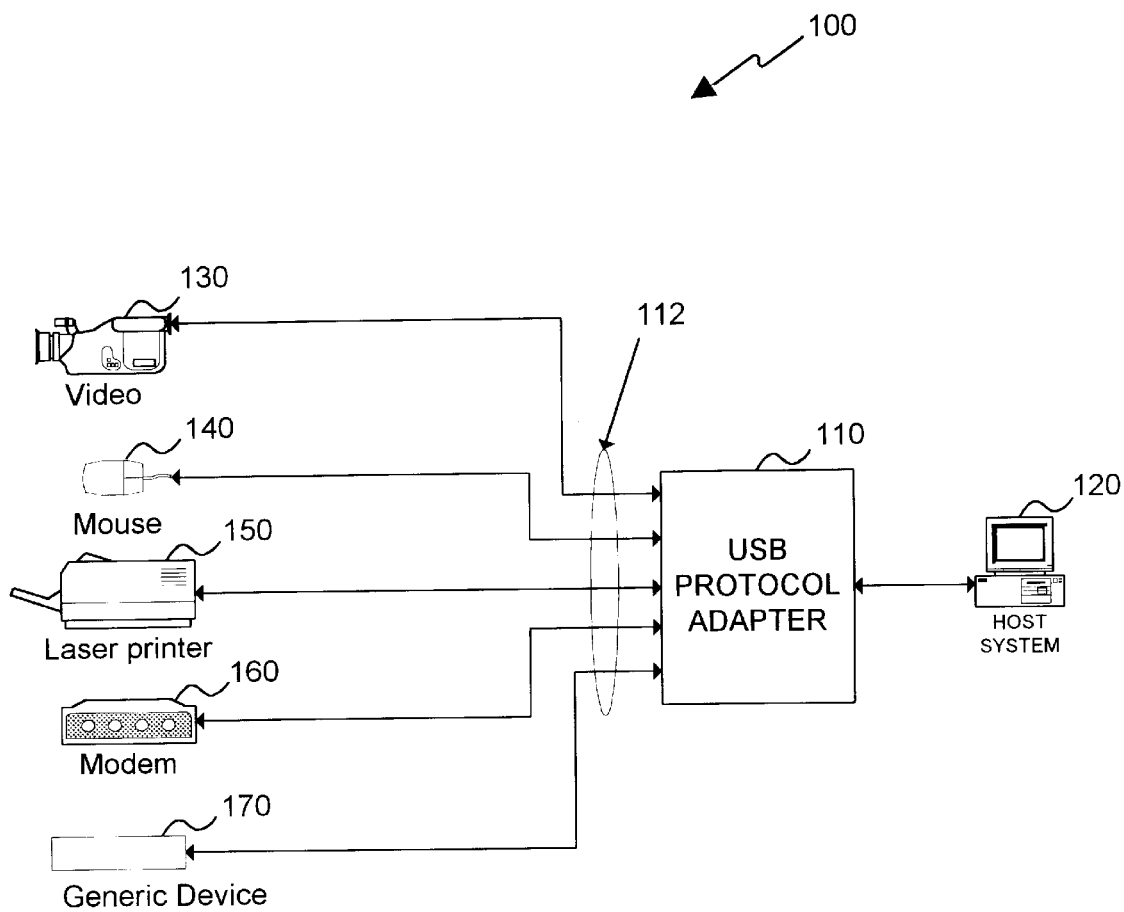
FIG. 1 illustrates a block diagram of an embodiment of a device communication system employing a universal serial bus protocol adapter system constructed in accordance with the principles of the present invention.

Referring initially to FIG. 1, illustrated is a block diagram of an embodiment of a device communication system, generally designated 100, employing a universal serial bus protocol adapter system 110 constructed in accordance with the principles of the present invention. The device communication system 100 includes the USB protocol adapter system 110 that is configured to transmit and receive data via a universal serial bus (USB) 112. For the purposes of the present invention, the phrase "configured to" means that the device, the system, or the subsystem includes the necessary software, hardware, firmware or a combination thereof to accomplish the stated task.

In the illustrated embodiment, the universal serial bus protocol adapter system 110 includes a field programmable universal serial bus application specific integrated circuit and is coupled to a host computer system 120. (See FIG. 2 for a description of an exemplary field programmable universal serial bus application specific integrated circuit). The universal serial bus protocol adapter system 110, in the illustrated embodiment, is also coupled to a video device 120, a mouse 140, a laser printer 150, a modem 160, and a generic device 170 all of which are configured to communicate via the USB 112 in the USB protocol. Also, the universal serial bus protocol adapter system 110 performs protocol conversion between the devices 130, 140, 150, 160, 170 and the host computer system 120. Additionally, the universal serial bus protocol adapter system 110 is configured to accommodate HotPlugable devices. Of course, however, the present invention is not limited to the types of devices listed above. In other embodiments, the present invention may handle and communicate with any number of devices and any type of device configured to communicate via a USB and in the USB protocol.

The host computer system 120, in one embodiment, is a conventional personal computer system. The host computer system 120 is also configured to communicate to each of the devices 130, 140, 150, 160, 170 via the universal serial bus protocol adapter system 110. In another embodiment, the universal serial bus protocol adapter system 110 may be embodied within the host computer system 120, such as an adapter card, or may be embodied within an embedded computer system (not shown).

Figure 2:
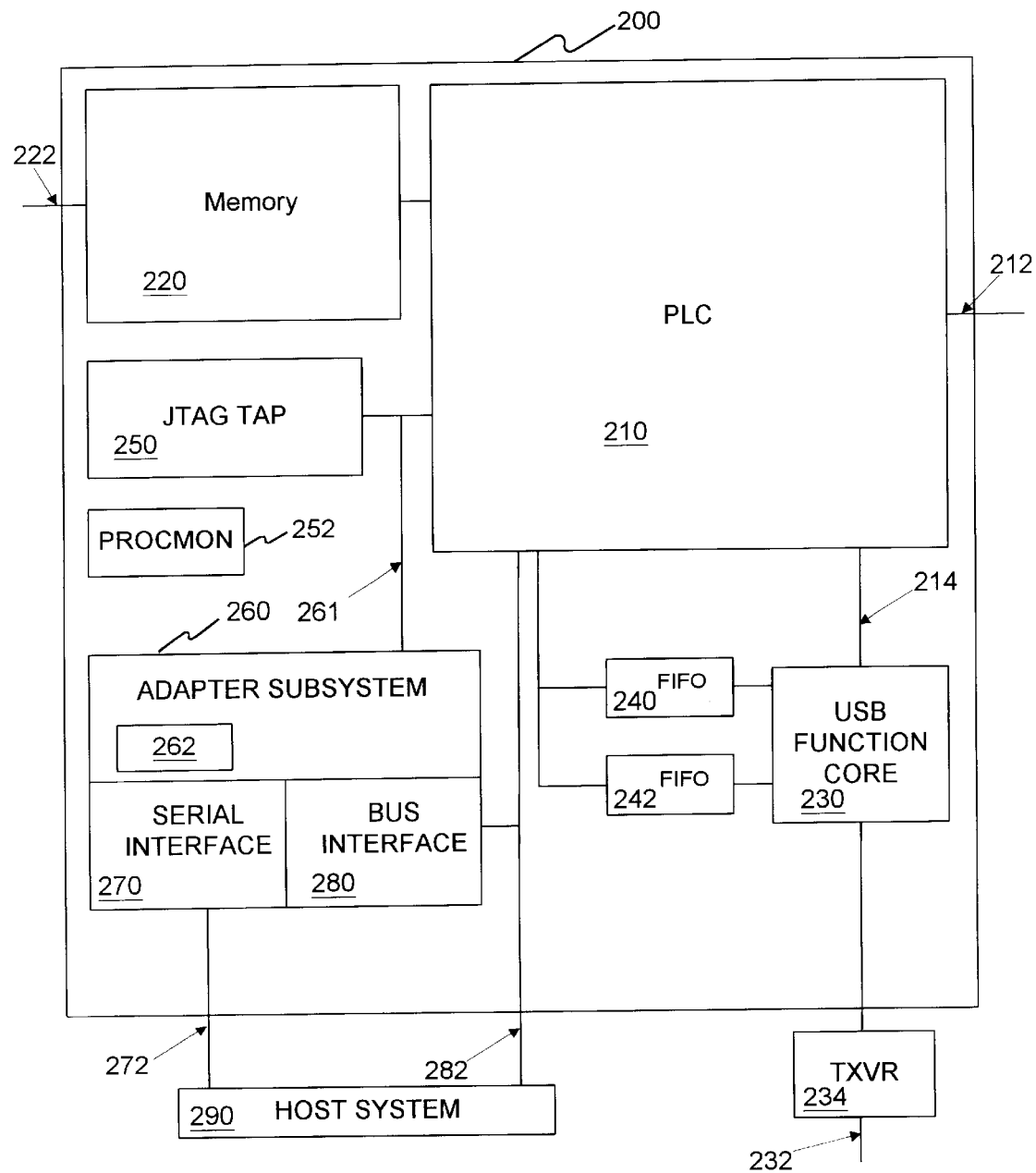
FIG. 2 illustrates a block diagram of an embodiment of a field programmable universal serial bus application specific integrated circuit constructed in accordance with the principles of the present invention.

Turning now to FIG. 2, illustrated is a block diagram of an embodiment of a field programmable universal serial bus application specific integrated circuit, generally designated 200, constructed in accordance with the principles of the present invention. The field programmable universal serial bus application specific integrated circuit 200, in one embodiment, may be employed in the universal serial bus protocol adapter system 110 of FIG. 1. The field programmable universal serial bus application specific integrated circuit 200 provides a new level of silicon-level flexibility that was previously unavailable on interface devices. Additionally, the field programmable universal serial bus application specific integrated circuit 200 provides the programmability of traditional field programmable gate array (FPGA) chips with the price and performance that, until now, only traditional application specific Integrated circuit (ASIC) chip processors could deliver. Likewise, the field programmable universal serial bus application specific integrated circuit 200 experiences a reduced time to market and a reduced risk after reaching market, both of which play a vital role in today's competitive market.

In the illustrative embodiment shown in FIG. 2, the field programmable universal serial bus application specific integrated circuit 200 includes a programmable logic core (PLC) 210 coupled to a USB function core 230. The PLC 210 includes an array of dynamically configurable arithmetic logic units. The phrase "dynamically configurable" with respect to the array of arithmetic logic units means that the array or a portion of the array of arithmetic logic units may be configured (e.g., programmed) while executing a current configuration. The dynamic configurability of the array of arithmetic logic units allows an ASIC that employs the array of arithmetic logic units to execute one configuration (e.g., a set of functions) for a given set of data and reconfigure and execute a new configuration for another set of data. This unique feature provides a degree of programming flexibility that was not previously available in the prior art hardwired ASIC devices.

In one advantageous embodiment, the PLC's array of dynamically configurable arithmetic logic units contains an array of 16 (4×4) Hex blocks. A Hex block is generally understood as the smallest geometric region used to build larger arrays. As such, arrays are commonly quoted in terms of Hex blocks, wherein each Hex block contains 16 quad blocks, and each quad block contains 4 register transfer level (RTL) configurable arithmetic logic units.

The PLC 210 is also configured to interface with the USB function core 230 and implement at least one application level function capable of performing protocol conversion to at least one processor bus protocol. The application level function may be capable of performing protocol conversion to an Advance Microcontroller bus Architecture (AMBA) protocol, a parallel bus protocol, a direct memory access (DMA) protocol, a PowerPC bus protocol and a MIPs bus protocol. One skilled in the pertinent art is familiar with the AMBA protocol, parallel bus protocol, DMA protocol, PowerPC bus protocol and the MIPs bus protocol. Of course, however, the present invention is not limited to the application level functions listed above.

The USB function core 230 is coupled to the PLC 210 via a USB function bus 214. The USB function core 230 is configured to send and receive data in a USB protocol via a USB transceiver 234 and the USB 232. (See FIG. 3 for a description of an exemplary USB function core). The USB transceiver 234 is a conventional transceiver configured to interface with the USB 232. In an alternative embodiment, the USB transceiver 234 may be embodied within the field programmable universal serial bus application specific integrated circuit 200. The USB function core 230 is also coupled to FIFOs 240 and 242, which are configured to provide buffering memory for communications between the USB function core 230 and the PLC 210.

Also included within the field programmable universal serial bus application specific integrated circuit 200 illustrated in FIG. 2, and coupled to the PLC 210, is an adapter subsystem 260. The adapter subsystem 260 is coupled to the PLC 210 by a control/test interface bus 261 and is configured to provide the necessary operational circuitry for the field programmable universal serial bus application specific integrated circuit 200. In the illustrative embodiment shown in FIG. 2, the adapter subsystem 260 includes a programmable logic core test circuit 262, a serial programming interface subsystem 270 and a bus interface subsystem 280.

The programmable logic core test circuit 262 is a conventional test circuit that is configured to allow testing of the PLC 210. The serial programming interface subsystem 270 is configured to allow a host computer system 290 to program the PLC 210 through a serial interface 272. In another embodiment, the serial interface 272 may be a local bus of the host computer system 290. The host computer system 290 may be a conventional computer system, a microprocessor, or a micro-controller.

As previously described, the PLC 210 is dynamically configurable; that is, the PLC 210 may be configured (e.g., programmed) by the host computer system 290 while the PLC 210 is executing a current configuration or an application level function. The dynamic configurability of the PLC 210 allows the field programmable universal serial bus application specific integrated circuit 200 to execute one configuration (i.e., set of application level functions) for a given data and reconfigure and execute a new configuration for another data.

The bus interface subsystem 280 is configured to allow the adapter subsystem 260 to communicate via a processor bus interface 282 with the host computer system 290. The bus interface subsystem 280 may send and receive commands from the host computer system 290 to setup or control the field programmable universal serial bus application specific integrated circuit 200. The bus interface subsystem 280 may also communicate with the PLC 210 via the processor bus interface 282.

In the illustrated embodiment, the PLC 210 is also coupled to the host computer system 290 via the processor bus interface 282. The application level function implemented in the PLC 210 is configured to communicate to the host computer system 290 via the processor bus interface 282 in at least one processor bus protocol. In one embodiment, the processor bus interface 282 may be a parallel bus, a serial bus, an Advanced Microcontroller bus Architecture (AMBA) advanced peripheral bus, or an AMBA advanced high-performance bus. One skilled in the pertinent art is familiar with a parallel bus, a serial bus, AMBA advanced peripheral bus and AMBA advanced high-performance bus. Of course, however, the present invention is not limited to the types of processor bus interfaces listed above. Other embodiments of the present invention may employ any type of processor interface bus.

The field programmable universal serial bus application specific integrated circuit 200, in one embodiment, may also include a conventional JTAG TAP controller 250, a conventional process monitor (procmon) 252 and a memory device 220. The procmon 360 is used to monitor the process of the field programmable universal serial bus application specific integrated circuit 200 during manufacturing. The memory device 220 is configured to provide memory for the field programmable universal serial bus application specific integrated circuit 200 and may be any type of conventional memory, such as a static random access memory (SRAM).

Additionally, the field programmable universal serial bus application specific integrated circuit 200 may include Input/Output (I/O) lines 212 coupled to the PLC 210 for controlling and responding to external events. The field programmable universal serial bus application specific integrated circuit 200 may also include I/O lines 222 coupled to the memory device 220. In a related embodiment, the I/O lines 222 may be a direct memory access bus with control lines for direct memory access by the host computer system 290.

While the block diagram illustrated in FIG. 2 shows some of the devices that may be included within the field programmable universal serial bus application specific integrated circuit 200, it should be noted that other components not shown may be included therein without departing from the scope of the present invention.

Figure 3:
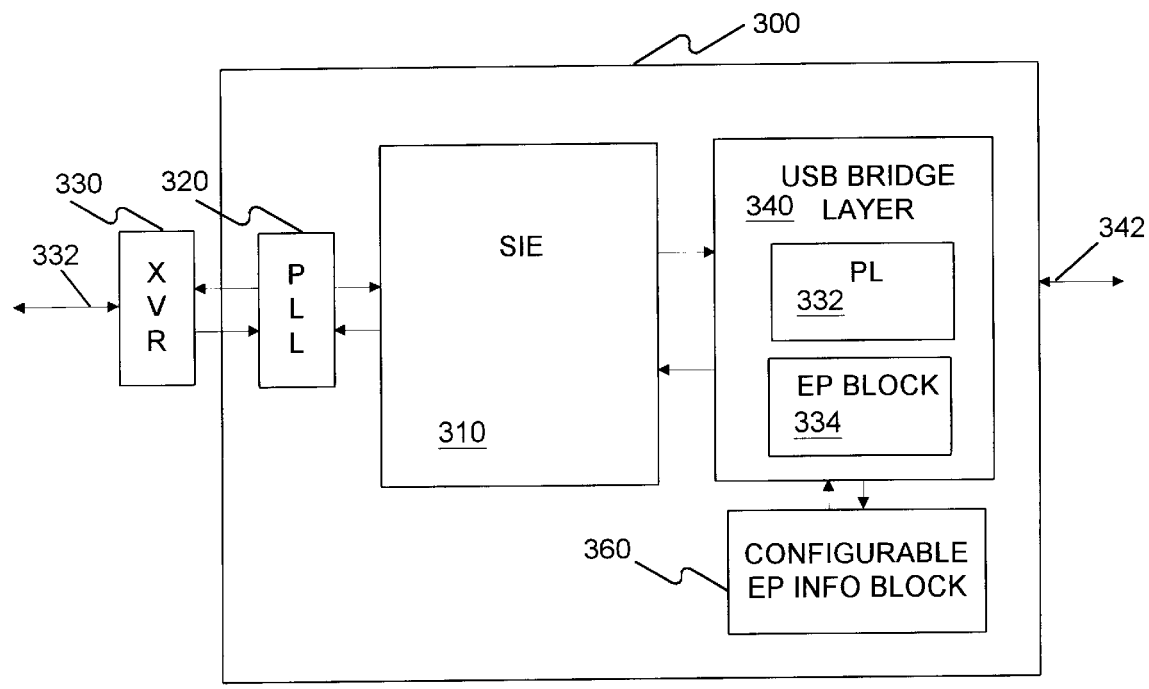
FIG. 3 illustrates a block diagram of an embodiment of a typical USB Function Core constructed in accordance with the principles of the present invention.

Turning now to FIG. 3, illustrated is a block diagram of an embodiment of a typical USB function core, generally designated 300, constructed in accordance with the principles of the present invention. The USB function core 300 may be any conventional USB function core commercially available, for example the CW000017, which may be purchased from LSI Logic Inc., having a business address of 1551 McCarthy Boulevard, Milpitas, Calif. 95035. The USB function core typically consists of a phase locked-loop (PLL) block 320, a serial interface engine (SIE) block 310, a USB bridge layer block 340 and a configurable endpoint information (EP INFO) block 360.

The PLL block 320 is the interface from the USB function core 300 to a USB transceiver 330 coupled to a USB 332. It consists of a phase-locked loop which recovers the embedded clock (PLL clock) from the incoming data stream and provides it to the SIE block 310 along with the serialized data. The PLL also identifies the SE0 (Single-Ended Zero) signal for system suspend and resume operation. One skilled in the pertinent art is familiar with phased-locked loops and embedded clocks associated with a USB.

Utilizing the recovered PLL Clock the SIE block 310 performs the serial to parallel data conversion from the PLL block 320 when the function is in the receive mode. The converted parallel data is then provided to the USB bridge layer block 340. When transmitting data back to the USB 332, the SIE block 310 performs the parallel to serial conversion and clock embedding of data from the USB bridge layer block 340 and forwards the data stream to the USB transceiver 330 via the PLL block 320.

The USB bridge layer block 340 is divided into the protocol layer (PL) 332, which serves as the interface between the SIE block 310 and an application interface 342, and an endpoint (EP) block 334. The application interface 342 is a bus or another type of interface that is used to communicate to a device coupled to the USB function core 300. The EP block 334 is configured to administer the control transfers to an endpoint of the USB 332.

As the parallel data is received from the SIE block 310 the USB bridge layer block 340 decodes the standard commands and sends the decoded command to peripheral function logic, such as the PLC 210 of FIG. 2, via the application bus 342. The USB bridge layer block 340 also generates the responses from the peripheral function and sends them as parallel data to the SIE block 310.

The EP INFO block 360 maintains address pointer registers that store information about supported endpoints, size of the configuration and supported string descriptors. The EP INFO block 360 is configured using a script compiler enabling the designer to easily optimize the implementation to minimize the memory size and maximize performance based on the application requirements. A hardwired option can further reduce the gate count and power.

Figure 4:
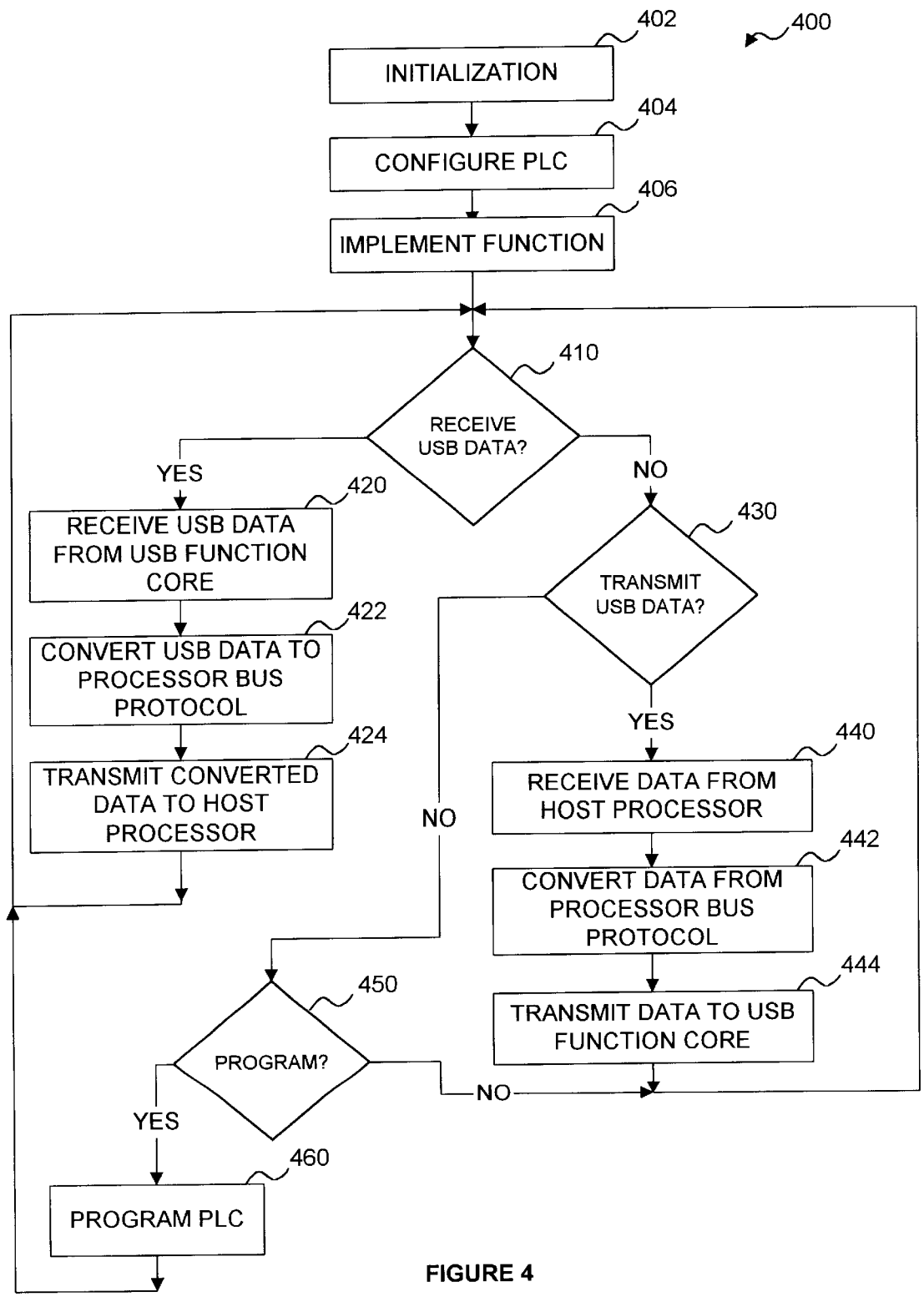
FIG. 4 illustrates a flow diagram of an embodiment of a method of operating a field programmable universal serial bus application specific integrated circuit constructed in accordance with the principles of the present invention.

Turning now to FIG. 4, illustrated is a flow diagram of an embodiment of a method, generally designated 400, of operating a field programmable universal serial bus application specific integrated circuit constructed in accordance with the principles of the present invention. In FIG. 4, the field programmable universal serial bus application specific integrated circuit first performs initialization in a step 402.

After initialization, the field programmable universal serial bus application specific integrated circuit configures a programmable logic core (PLC) to interface with a USB function core, such as the USB function core 300 of FIG. 3, in a step 404. Next, the field programmable universal serial bus application specific integrated circuit implements at least one application level function capable of performing protocol conversion to at least one processor bus protocol in the PLC in a step 406. In one embodiment, the application level function may perform protocol conversion to an Advanced Microcontroller bus Architecture (AMBA) protocol, a parallel bus protocol, a direct memory access protocol, a PowerPC bus protocol or a MIPs bus protocol.

The field programmable universal serial bus application specific integrated circuit then determines if there is USB data to process from the USB function core in a decisional step 410. If the field programmable universal serial bus application specific integrated circuit has USB data to receive, the field programmable universal serial bus application specific integrated circuit receives the USB data from the USB function core in a step 420. The field programmable universal serial bus application specific integrated circuit then performs- or executes the implemented application level function on the received USB data to convert the USB data into a processor bus protocol in a step 422.

Next, the field programmable universal serial bus application specific integrated circuit employs the PLC to transmit the converted data to a host processor coupled to the field programmable universal serial bus application specific integrated circuit in a step 424. In a related embodiment, the field programmable universal serial bus application specific integrated circuit transmits the converted data via a processor bus interface. The processor bus interface, in one embodiment, may be a parallel bus, a serial bus, an AMBA advanced peripheral bus or a AMBA advanced high-performance bus. The field programmable universal serial bus application specific integrated circuit then returns to determine if there is additional USB data to be received in the decisional step 410.

If the field programmable universal serial bus application specific integrated circuit does not have USB data to receive in the decisional step 410, the field programmable universal serial bus application specific integrated circuit then determines if there is data to transmit to the USB function core in a decisional step 430. If there is data to transmit to the USB function core, the PLC of the field programmable universal serial bus application specific integrated circuit receives the data from the host processor in a step 440. The PLC of the field programmable universal serial bus application specific integrated circuit then performs at least one application level function on the data to convert the data from the processor bus protocol in a step 442. The PLC then sends the data to the USB function core to be transmitted out the USB in a step 444. The field programmable universal serial bus application specific integrated circuit then returns to determine if there is additional USB data to be received in the decisional step 410.

If there is no data to transmit to the USB function core in the decisional step 430, the field programmable universal serial bus application specific integrated circuit then determines if the PLC is to be programmed in a decisional step 450. If the PLC is to be programmed, the PLC is programmed in a step 460. In one embodiment, the PLC may be programmed while the PLC is executing an application level function. In another embodiment, the PLC may be programmed based upon a programmed received from a serial programming interface. The field programmable universal serial bus application specific integrated circuit then returns to determine if there is additional data to be received in the decisional step 410.

If the PLC is not to be programmed, the field programmable universal serial bus application specific integrated circuit then returns to determine if there is additional data to be received in the decisional step 410. One skilled in the art should know that the present invention is not limited to the type of processing performed nor the steps described above. Other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A field programmable universal serial bus application specific integrated circuit, comprising:

a universal serial bus function core configured to transmit and receive data via a universal serial bus; and a programmable logic core having an array of dynamically configurable arithmetic logic units, said programmable logic core configured to interface with said universal serial bus function core and implement at least one application level function capable of performing protocol conversion to at least one processor bus protocol.

2. The field programmable universal serial bus application specific integrated circuit as recited in claim 1 further comprising a processor bus interface coupled to said programmable logic core, said at least one application level function communicating via said processor bus interface in said at least one processor bus protocol.

3. The field programmable universal serial bus application specific integrated circuit as recited in claim 2 wherein said processor bus interface is one selected from the group consisting of:

a parallel bus, a serial bus, an Advance Microcontroller bus Architecture advanced peripheral bus, and an Advance Microcontroller bus Architecture advanced high-performance bus.

4. The field programmable universal serial bus application specific integrated circuit as recited in claim 1 wherein said at least one application level function capable of performing protocol conversion to one selected from the group consisting of:
- an Advance Microcontroller bus Architecture (AMBA) protocol,
- a parallel bus protocol,
- a direct memory access protocol,
- a PowerPC bus protocol, and
- a MIPs bus protocol.

5. The field programmable universal serial bus application specific integrated circuit as recited in claim 1 further comprising a serial programming interface configured to receive said at least one application level function and program said programmable logic core therewith.

6. The field programmable universal serial bus application specific integrated circuit as recited in claim 1 wherein said programmable logic core may be programmed while said at least one application level function is executing.

7. The field programmable universal serial bus application specific integrated circuit as recited in claim 1 further comprising a universal serial bus transceiver that provides a physical interface to at least one peripheral device coupled to said universal serial bus.

8. A method of operating a field programmable universal serial bus application specific integrated circuit, comprising:
- configuring a programmable logic core, having an array of dynamically configurable arithmetic logic units, to interface with a universal serial bus function core and implement at least one application level function capable of performing protocol conversion to at least one processor bus protocol,
- transmitting and receiving data via a universal serial bus with said universal serial bus function core.

9. The method as recited in claim 8 further comprising communicating in at least one processor bus protocol via a processor bus interface coupled to said programmable logic core.

10. The method as recited in claim 9 wherein said processor bus interface is one selected from the group consisting of:
- a parallel bus,
- a serial bus,
- an Advance Microcontroller bus Architecture advanced peripheral bus, and
- an Advance Microcontroller bus Architecture advanced high-performance bus.

11. The method as recited in claim 8 further comprising performing protocol conversion to one selected from the group consisting of:
- an Advance Microcontroller bus Architecture (AMBA) protocol,
- a parallel bus protocol,
- a direct memory access protocol,
- a PowerPC bus protocol, and
- a MIPs bus protocol.

12. The method as recited in claim 8 further comprising receiving said at least one application level function with a serial programming interface and programing said programmable logic core therewith.

13. The method as recited in claim 8 further comprising programming said programmable logic core while executing said at least one application level function.

14. The method as recited in claim 8 further comprising employing a universal serial bus transceiver to provide a physical interface to at least one peripheral device coupled to said universal serial bus.

15. A universal serial bus protocol adapter system, comprising:
- a field programmable universal serial bus application specific integrated circuit, including:
  - a universal serial bus function core that transmits and receives data via a universal serial bus; and
  - a programmable logic core having an array of dynamically configurable arithmetic logic units, said programmable logic core interfaces with said universal serial bus function core and implements at least one application level function capable of performing protocol conversion to at least one processor bus protocol;
- a host processor that receives and transmits data with said field programmable universal serial bus application specific integrated circuit in said at least one processor bus protocol;
- at least one universal serial bus transceiver, coupled to said field programmable universal serial bus application specific integrated circuit, that provides a physical interface to at least one peripheral device coupled to said universal serial bus.

16. The universal serial bus protocol adapter system as recited in claim 15 further comprising a processor bus interface coupled to said programmable logic core, said at least one application level function communicating with said host processor via said processor bus interface in said at least one processor bus protocol.

17. The universal serial bus protocol adapter system as recited in claim 16 wherein said processor bus interface is one selected from the group consisting of:
- a parallel bus,
- a serial bus,
- an Advance Microcontroller bus Architecture advanced peripheral bus, and
- an Advance Microcontroller bus Architecture advanced high-performance bus.

18. The universal serial bus protocol adapter system as recited in claim 15 wherein said at least one application level function capable of performing protocol conversion to one selected from the group consisting of:
- an Advance Microcontroller bus Architecture (AMBA) protocol,
- a parallel bus protocol,
- a direct memory access protocol,
- a PowerPC bus protocol, and
- a MIPs bus protocol.

19. The universal serial bus protocol adapter system as recited in claim 15 wherein said field programmable universal serial bus application specific integrated circuit further includes a serial programming interface configured to receive said at least one application level function and program said programmable logic core therewith.

20. The universal serial bus protocol adapter system as recited in claim 15 wherein said programmable logic core may be programmed while said at least one application level function is executing.

* * * * *